June 24, 1952 W. P. ASTEN 2,601,236

FACSIMILE MACHINE

Filed Sept. 18, 1948 2 SHEETS—SHEET 1

INVENTOR.
William P. Asten
BY Percy P. Lantzy
ATTORNEY

FACSIMILE MACHINE

Filed Sept. 18, 1948 2 SHEETS—SHEET 2

INVENTOR.
William P. Asten
BY
Percy P. Lantzy
ATTORNEY

Patented June 24, 1952

2,601,236

UNITED STATES PATENT OFFICE 2,601,236

FACSIMILE MACHINE

William P. Asten, Saddle River, N. J., assignor to Federal Telephone and Radio Corporation, New York, N. Y., a corporation of Delaware Application September 18, 1948, Serial No. 49,875

18 Claims. (Cl. 178—6.6)

This invention relates to facsimile machines and more particularly to facsimile transmitting machines of the movable carriage type.

A principal object of the invention is to provide an improved arrangement for automatically stopping a facsimile transmitting machine as soon as it has completed scanning subject matter that covers only a limited area of scanning field.

Another object is to provide a facsimile transmitting machine of the kind having a rotary scanning drum and a moving carriage or scanning head, wherein the carriage is automatically stopped in accordance with the extent of that portion of the scanning field which contains subject matter to be transmitted.

A further object is to provide an improved automatic carriage limiting and return control for facsimile machines.

The above-mentioned and other features and objects of this invention and the manner of attaining them will become more apparent and the invention itself will be best understood, by reference to the following description of an embodiment of the invention taken in conjunction with the accompanying drawings, wherein.

It very frequently happens that when loading a facsimile transmitter with a record sheet or blank, the subject matter to be transmitted, does not cover the full length of the sheet or the total scanning field of the machine. For example, in the case of printed or typewritten matter, the sheet may contain only a relatively small number of successive lines of subject matter. However, when the scanning mechanism has once been started, it would ordinarily continue to scan the full length of the sheet, with consequent loss of usable transmission time and unnecessary operation of the mechanism. Heretofore, it has been necessary under such circumstances, for the attendant continuously to supervise the operation of the transmitter machine so that when the end of the subject matter is reached, the mechanism can be manually returned to its normal position. In many instances, it is not feasible or economical to have an attendant continually supervising the operation of the machine. Furthermore, it is highly desirable in some cases to have a completely automatic mechanism which requires merely the insertion of the copy paper to start the cycle of operation. Accordingly, the present invention provides an arrangement whereby this result can be achieved.

Figure 1:
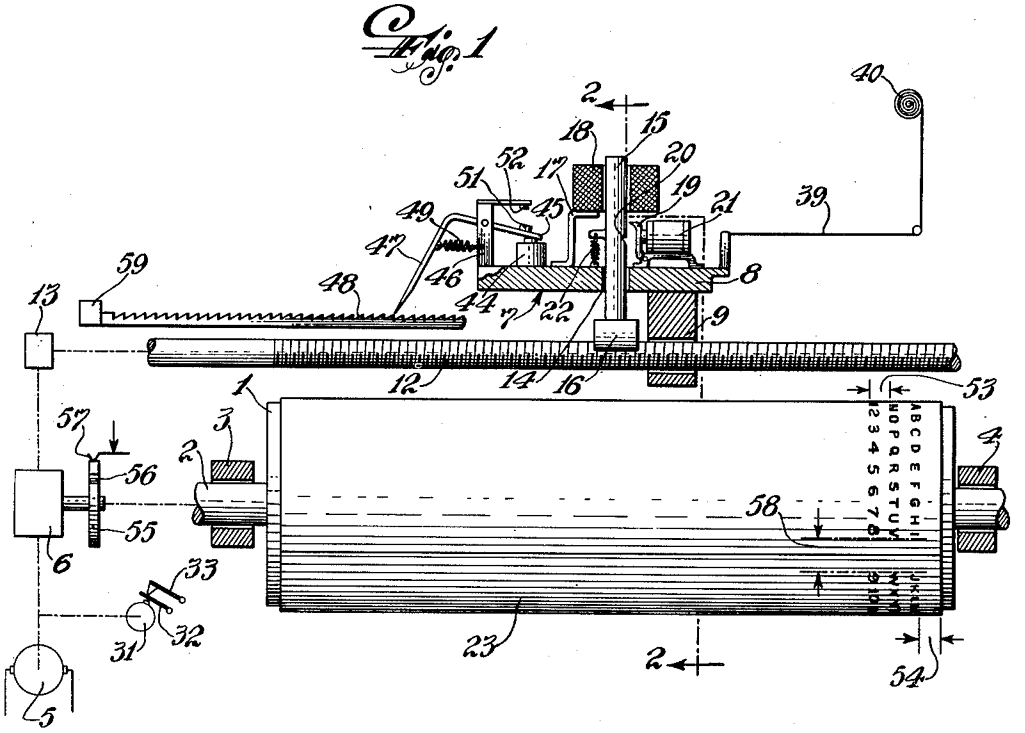
Fig. 1 is a composite structural and schematic front view of a facsimile transmitting machine according to the invention.
Figure 2:
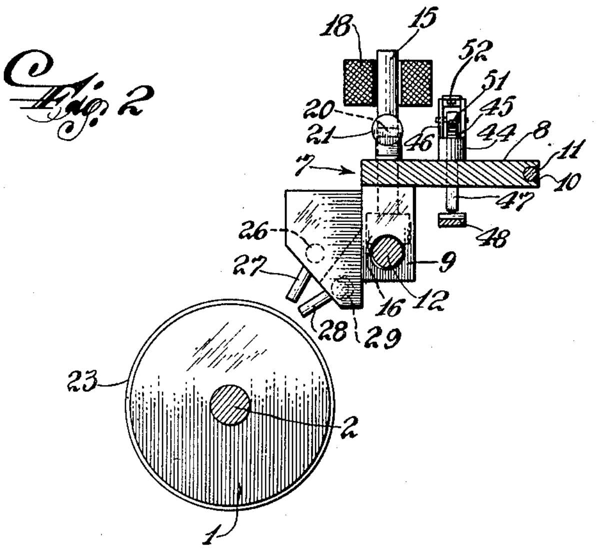
Fig. 2 is a partial end view of Fig. 1.

Referring to Figs. 1 and 2, a form of facsimile scanning drum 1 is shown which is supported at opposite ends by shaft 2 in suitable bearings 3, 4. A suitable driving motor 5 is connected through appropriate gearing 6 to the shaft 2, whereby the drum 1 is rotated continuously at a predetermined rate. Mounted adjacent the drum 1 on suitable standards (not shown), is a scanning head or carriage 7, which may comprise a metal frame 8 carrying at its front edge a guide sleeve 9 and at its rear edge being provided with a guide slot 10 which rides upon a fixed guide bearing 11. Passing freely through the sleeve 9 is a lead screw 12 of sufficient length to accommodate the complete traversing movement of the carriage 7. The lead screw 12 is supported at its opposite ends in suitable bearings (not shown) and is driven at a predetermined rotational rate from the motor 5 through suitable gearing 13.

The carriage 7 has a vertical opening 14 in which is slidably mounted a plunger 15 that carries at its lower end a half nut or lead screw follower 16. Also mounted on the carriage 7 by a suitable bracket 17 is a solenoid 18 which, when energized, raises the plunger 15 to decouple the follower 16 from the lead screw 12. The plunger 15 is adapted to be locked in its raised position by means of a pivoted latch spring 19 which is adapted to engage a corresponding notch 20 in the surface of plunger 15. The latch spring 19 is controlled by an electromagnet 21 supported on the carriage 7, and which when energized, withdraws the latch 19 from the notch 20. If the solenoid 18 is deenergized, the plunger 15 drops to engage the follower 16 with the lead screw 12. The plunger 15 is preferably provided with a spring 22 to maintain the follower 16 in engagement with screw 12.

Consequently, as the scanning drum 1 rotates, the carriage 7 traverses the drum along its length. In accordance with the present invention, the sheet 23 containing the subject matter to be scanned, has that subject matter arranged, for example, in successive lines, and the sheet 23 is loaded on to the drum 1 so that the lines of subject matter extend around the periphery of the drum. In other words, if the sheet 23 is a conventional sheet in which the subject matter is typewritten or printed across the width of the sheet, the sheet is loaded on to the drum with its length extending along the length of the drum and with the sheet width wrapped around the drum, the top of the sheet being located at the end of the drum first to be scanned. It will be understood, of course, that the sheet 23 when loaded on the drum 1 is held taut against the drum periphery by any well-known paper clamping means (not shown). For each successive complete revolution of the drum, the carriage 7 is advanced to the left (Fig. 1) a distance determined by the pitch of the lead screw 12.

The carriage 7 has mounted thereon any suitable scanning head such as is conventionally employed in facsimile scanning machines. This scanning head is schematically represented in Fig. 2 by the lamp or light source 26 with its optical system 27 for illuminating the sheet 23 in a minute scanning spot. The light from this scanning spot can be picked up by another optical system 28 to energize the photoelectric cell 29 whose output can be amplified and used to modulate a suitable carrier wave for transmission to a distant point. Inasmuch as scanning heads of this general type are well-known in the facsimile art, detailed description is not necessary for an understanding of the present invention. Also driven from the motor 5 is a cam 31 which controls contacts 32, 33. As soon as the motor 5 starts to operate, the cam 31 closes the contacts 32 and 33 and momentarily energizes the magnet 21. This results in withdrawing of the latch 19 and the plunger 15 drops to engage the follower 16 with the lead screw 12.

The return-to-normal position of the carriage 7 is controlled by a cloth tape 39 controlled by coil spring 40. Consequently, as the carriage 7 is being moved to the left for scanning purposes, the spring 40 is tensioned but the carriage is restrained against returning to normal by engagement between the half nut 16 and "buttress" threads on lead screw 12. However, when the magnet 18 is energized, the nut 16 is disengaged from screw 12, and the spring 40 pulls the carriage back to its normal position.

Also mounted on the carriage 7 is an electromagnet 44 whose armature 45 is pivotally mounted on a bracket 46. Attached to the end of armature 45 is an elongated detent finger 47, which is arranged to cooperate with a toothed rack 48 mounted in spaced parallelism with the screw 12. A spring 49 tends to rotate the armature 45 and detent 47 in a counter-clockwise direction so as to engage the detent finger with the teeth of rack 48. However, when the magnet 44 is energized, it holds the armature 45 and the detent 47 in the position shown in Fig. 1 disengaged from the rack 48. The armature 45 carries a contact 51 for engagement with another contact 52 insulatingly mounted on the bracket 46. Thus when the magnet 44 is energized, the contacts 51 and 52 are open.

In accordance with one feature of the invention, the magnet 44 is arranged to be energized as long as the scanning head is scanning black or dark areas on the sheet 23, and it is de-energized when the scanning head is scanning white or blank areas on the sheet 23. The dimensions of the detent 47 and its leverage with respect to its pivot point, and the spacing of contacts 51 and 52 are so arranged that when the detent 47 engages the rack 48, the continued scanning motion of the carriage 7 to the left (Fig. 1) causes the armature 45 to be rotated counter-clockwise, but the circuit between contacts 51 and 52 is not closed until the carriage 7 has moved a predetermined distance after the detent 47 engages rack 48.

It will be understood, of course, that the interline spacing 53 of the subject matter on sheet 23 is less than the said distance, so that the contacts 51, 52 do not close while the scanning head is scanning the blank area between successive lines. furthermore, the blank space 54 between the beginning of the sheet 23, or the outer edge of the scanning field of the machine and the first line of the subject matter should likewise be less than the said distance.

Rotated in unison with the shaft 2 is a cam 55 having a recess 56. Cooperating with the cam 55 is a follower 57. Follower 57 controls a substitute de-energizing circuit for the magnet 44. The cam recess 56 is so oriented that when the scanning head is scanning the overlap region 58 of the sheet 23, this substitute circuit is effective to maintain magnet 44 de-energized as will be explained in connection with Fig. 3. Consequently, when the scanning head moves beyond the portion of the sheet 23 containing subject matter to be transmitted, it is scanning a substantially continuous white or blank surface, and after the predetermined length of such blank surface has been scanned, the contacts 51, 52, close and complete the circuit for the solenoid 18. As soon as magnet 18 is energized, the plunger 15 is lifted whereby it is latched in its raised position by latch 19.

In order to effect the automatic return of the carriage 7 to its normal position should the entire length of sheet 23 contain subject matter to be transmitted, there is provided a rigid stop 59 which engages the detent 47 at the extreme left-hand position of the scanning head so as to rotate the said detent and close the contacts 51, 52 which action results in energization of solenoid 18 thereby the return of the carriage to normal.

Figure 3:
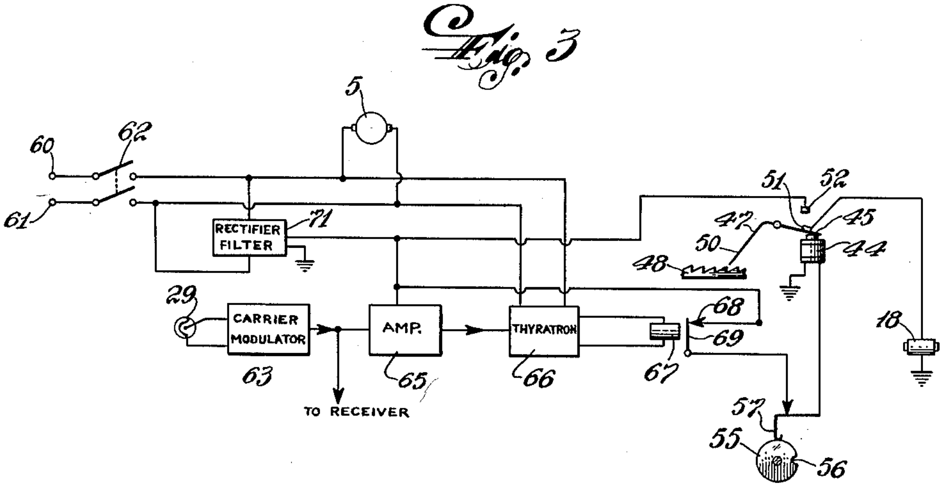
Fig. 3 is a schematic wiring diagram of the electrical control circuits cooperating with the mechanism of Figs. 1 and 2.

Referring to Fig. 3, there is shown in schematic form a typical electric circuit diagram that may be used with the apparatus of Figs. 1 and 2. Before or after the paper sheet 23 has been loaded and clamped to the drum 1, depending on whether the paper loading is manual or automatic, the motor 5 is energized such as by completing the power circuit to terminals 60, 61, through switch 62. As is well-known in the art, the distant facsimile receiving machine is phased with the transmitter. When the phasing operation has been completed, the magnet 21 having been energized under control of the contacts 32 and 33, plunger 15 drops and the follower 16 engages the lead screw 12. The scanning head thereupon scans the subject matter on sheet 23. The scanning of the black and white areas sets up corresponding facsimile signals from the photo-electric cell 29 which can be used to modulate a suitable carrier in the modulator device 63. Thus the modulated carrier signal can be transmitted over a suitable line or channel to the receiving station (not shown). A portion of this signal is also applied to a suitable amplifier 65 whose output controls a grid-controlled gaseous conduction tube 66 such as a Thyratron. The plate supply for the Thyratron 66 can be derived directly from the alternating current terminals 60, 61. However the amplifier 65 is biased so that tube 66 becomes plate current conductive or "fires" only when the output of amplifier 65 is of a magnitude which results in the application of a positive-phase voltage to the control grid of the Thyratron 66. In other words, tube 66 fires only when the scanning head of the facsimile scanner is scanning a blank or white area of the sheet 23; and this tube 66 remains non-plate current conductive when the scanning head is scanning a black area.

As long as tube 66 is not in firing condition, the relay 67 in its output circuit remains de-energized and at its contacts 68, 69, provides an energizing circuit for the magnet 44. Thus magnet 44 is maintained energized as long as the scanning head is scanning black or dark areas representing subject matter to be transmitted. During the overlap or margin portion 58 of the sheet 23, the cam 55 provides a substitute de-energizing circuit for the magnet 44.

As soon as magnet 44 is de-energized in response to the scanning of a white or blank area, the detent 47 engages the rack 48 and after a predetermined amount of travel of the carriage to the left, the contacts 51, 52, close and complete a circuit through the winding of the magnet 18 for disengaging the follower 16 from the lead screw 12 and permitting the carriage to return to normal under the tension of spring 40. During this return movement of the carriage, the magnet 21 is de-energized and the latch 19 holds the plunger 15 in its raised position. When the carriage has fully returned to normal, the circuit to the motor 5 may be automatically opened bringing the mechanism to rest.

Figure 4:
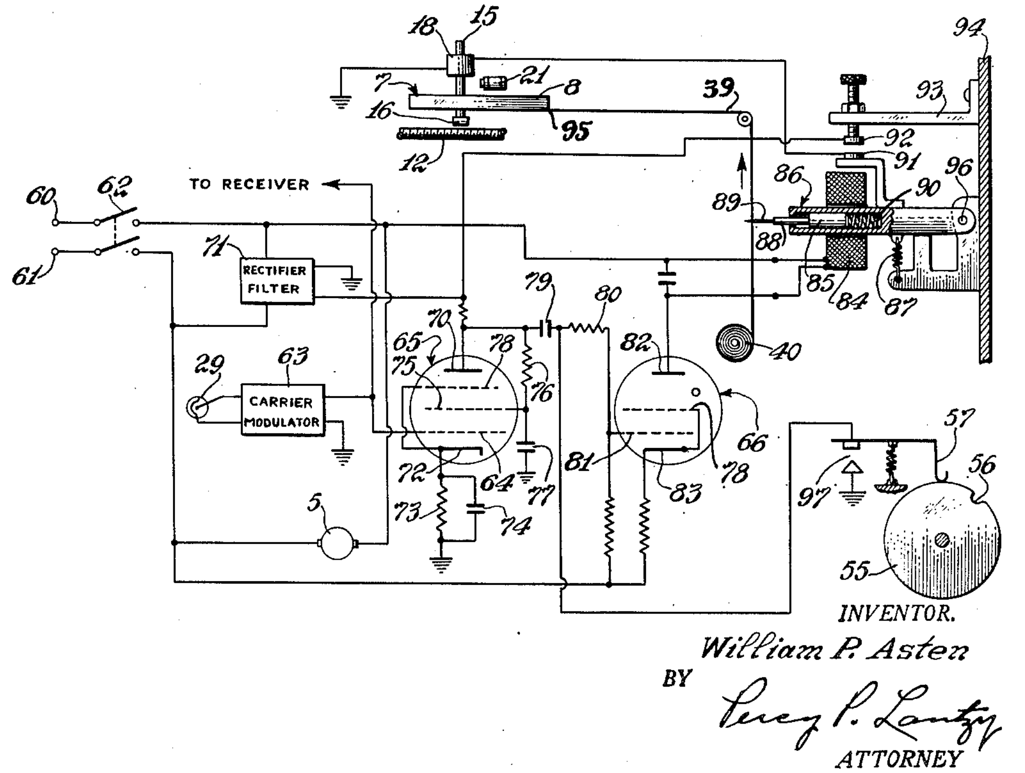
Fig. 4 is a composite structural and schematic wiring diagram of a modification of the invention.

Referring to Fig. 4, a description will now be given of a modification of the invention. The elements of Fig. 4 which are structurally and functionally the same as corresponding elements of Figs. 1–3 are designated by the same numeral. When the power circuit from the alternating current supply terminals 60, 61 has been completed through switch 62, the motor 5 is energized. When the phasing of the receiving and transmitting drums has been accomplished, magnet 21 having been energized under control of contacts 32, 33, the follower 16 engages the lead screw 12. The scanning head thereupon scans the subject matter on sheet 23. The scanning of the black and white areas, sets up corresponding facsimile signals from the photo-electric cell 29 which are used to modulate a suitable carrier in the modulator device 63. Thus, the modulated carrier facsimile signal can be transmitted over a suitable line or channel to the receiving station (not shown). A portion of this signal is also applied to the control grid 64 of a grid-controlled vacuum tube amplifier 65 whose plate 70 is supplied with direct current through the rectifier-filter 71 from the terminals 60, 61. The cathode 72 can be self-biased by the usual resistor 73 and shunt condenser 74. If the tube 65 is of the pentode type as shown, the shield grid 75 can be connected through a suitable resistor 76 to the plate supply source, and the resistor 76 can be by-passed to ground by the usual condenser 77. Likewise, the suppressor grid 78 can be connected directly to the cathode 72. It will be understood, of course, that while the drawing shows a pentode amplifier tube, any other well-known form of grid-controlled tube may be employed.

The plate 70 is coupled through a suitable condenser 79 and resistor 80 to the control grid 81 of the grid-controlled gaseous conduction tube 66; such for example as a "Thyratron." The alternating current from supply terminals 60 and 61, can be connected across the plate 82 and cathode 83 of tube 66, and the control grid 81 is suitably biased so that tube 66 becomes plate current conductive only when the plate current of tube 65 is of a magnitude which results in the application of a positive-phase voltage to grid 81 of sufficient magnitude to fire tube 66. In other words, tube 66 fires only when the scanning head of the facsimile scanner is scanning a black or printed area of the sheet 23; and tube 66 remains non plate current conductive when the scanning head is scanning a white or blank area.

When tube 66 is conductive, the rectifier plate current thereof flows through a solenoid 84 carried on a pivotally mounted member 86 which is held in its normal position as shown by means of a tension spring 87. Member 86 has slidably mounted therein an element 88 which terminates in a needle point 89 at one end and an armature 85 at the other end. The element 88 is normally urged to the left (Fig. 4) by means of a spring 90. Member 86 also carries a contact 91 which cooperates with another contact 92 which can be adjustably mounted on a member 93, carried by the frame 94 When the solenoid 84 is energized, it attracts the armature 85 and moves the element 88 to the right. The member 86 is so mounted that when solenoid 84 is de-energized, the needle point 89 is moved by spring 90 sufficiently to the left to pierce tape 39. However, when the solenoid 84 is energized, the needle point 89 is moved to the right so that it is slightly spaced from the moving cloth tape 39. The tape 39 has one end 95 coupled to the end of carriage 7, and it is taken off a tape reel against the action of spring 40. Consequently, the tape 39 moves in the direction of its length a distance proportional to the traversing movement of the carriage 7. Furthermore, when the needle point 89 pierces the tape, the tape bodily pivots the member 86 at 96 and its contact 91 until eventually this contact 91 engages the contact 92.

The cam 55 is arranged to normally keep contacts 97 open. However, during the overlap portion 58 (Fig. 1), the recess 56 in the cam 55 permits contacts 97 to close, shorting out control signals through condenser 79 thereby causing the solenoid 84 to be de-energized. It will be clear therefore, that by adjusting the normal spacing between the contacts 91 and 92, a predetermined period can be provided after the needle 89 pierces the tape before the contacts 91 and 92 close. Thus, if the scanning head continues to scan a blank or white section of the sheet 23 of a predetermined length, for example one-quarter inch, after the last subject matter line has been scanned, the tape 39 carries the contact 91 into engagement with contact 92. Thereupon, an operating impulse is passed through the solenoid 18 which immediately latches up for carriage return.

From the foregoing, it will be seen that by adjusting the normal spacing of the contacts 91 and 92, any desired length of blank section of the sheet 23 can be scanned before the carriage 7 is automatically returned to normal position, thus providing any desired adjustable margin limit for the traversing movement of the said carriage. Consequently, if a considerable area of the sheet 23 is white or blank, it is not necessary for the carriage and the associated mechanism to undergo a complete scanning of the drum. Further, while "white" has been referred to herein as "blank" and "black" as the part to be transmitted, the reverse, of course, may be the case as where negative copy is to be transmitted. In that case the "black" or "dark" areas would be treated as "blank" and the machine adjusted accordingly.

While I have described above the principles of my invention in connection with specific apparatus, it is to be clearly understood that this description is made only by way of example and not as a limitation to the scope of my invention.

I claim:

1. Facsimile apparatus comprising a carriage, means for moving said carriage progressively from a normal position, scanning means mounted upon said carriage and adapted to scan a subject matter sheet in successive elemental areas, means for returning said carriage to a normal position, and means coupled to the output of said scanning means for controlling said carriage returning means, said control means responsive to the scanning by said scanning means of a blank area of said sheet of predetermined extent.

2. Facsimile apparatus as claimed in claim 1 further comprising additional means for controlling operation of said carriage returning means when a complete subject matter sheet has been scanned, said additional means comprising a switch contact mounted on said carriage and adapted to be actuated when said carriage has moved a predetermined distance.

3. Facsimile apparatus for scanning a surface having an area of light and dark shades wherein the continuous scanning of a single shade indicates the termination of facsimile scanning, comprising a scanning head, a carriage for said head, means for progressively moving said carriage from a normal position to cause said head to scan a surface for areas of light and dark shades, means for returning said carriage to a normal position, and means coupled to the output of said scanning head for controlling said carriage returning means, said control means responsive to the scanning by said head of a predetermined number of areas of said single shade upon said surface extending in the direction of the progressive movement of said head.

4. Facsimile apparatus comprising a rotatable drum carrying subject matter to be transmitted, a device for scanning said subject matter, means to traverse said device in timed relation to the rotation of said drum to cause said device to scan elemental areas of said subject matter, means selectively responsive to the shade of successively scanned areas of said subject matter, said last named means coupled to said scanning device, means for returning said device to a normal position with respect to said drum, control means coupled between said selectively responsive means and said device returning means, said control means adapted to remain inoperative while said selectively responsive means responds to similar shaded areas of said subject matter and adapted to become operative a predetermined time after said scanning device scans unshaded areas of said subject matter.

5. Facsimile apparatus comprising a rotatable drum carrying a sheet bearing subject matter, a device for scanning said sheet, a carriage for traversing said head along the length of said drum, a device adjacent one end of said drum for returning said carriage to a normal position, means coupled to the output of said scanning device for deriving a control voltage when said scanning device scans blank areas of said sheet, beyond a predetermined extent, means coupled between said last named means and said carriage returning device for actuating said carriage returning device upon application of said control voltage.

6. Facsimile apparatus as claimed in claim 5, wherein said means for actuating said carriage returning device comprises means movable under control of said control voltage and in timed relation to and in proportion to the extent of carriage movement, for causing said actuating means to close an electrical circuit to control said carriage returning means, when said blank area on said sheet along the drum length exceeds a predetermined extent.

7. Facsimile apparatus comprising a rotatable scanning drum carrying a sheet bearing subject matter to be transmitted, a scanner for scanning said sheet in elemental areas, means to move said scanner progressively along the length of said drum, means to return said last named means to its initial position, means coupled to the output of said scanner and adapted to selectively respond to the scanning of blank areas of said sheet by said scanner, said last named means adapted to furnish a control voltage upon the scansion of blank areas of said sheet by said scanner, actuable means under control of the voltage furnished by said last named means for controlling said returning means when a predetermined number of successive blank areas of said sheet occurring in the direction of the drum length have been scanned.

8. Facsimile apparatus as claimed in claim 7, wherein said actuable means comprises a pair of movable elements, a first of said elements associated with said means to progressively move said scanner, the second of said elements adapted to have a normal position, a second and a third position, said second element adapted to move to a normal position from a first position under control of said control voltage, and adapted to move from a first position to a second position under control of the movement of said means to progressively move said scanner, said second element adapted to control said first element when in its second position.

9. Facsimile apparatus according to claim 7, in which said actuable means comprises a relay having a pair of spaced circuit-controlling contacts and said returning means comprises a tape movable in timed relation with said scanner, said relay having a member which is coupled to said tape to move one of said contacts only when said scanner is scanning blank areas.

10. Facsimile apparatus according to claim 7, in which said carriage return means includes a detent and a toothed rack, and means to cause said detent to have engagement with said rack during the scanning of blank areas.

11. Facsimile apparatus comprising a facsimile scanner having a movable carriage, means coupled to the output of said scanner to derive a control voltage therefrom relay means coupled to said last named means which responds to said control voltage when said scanner scans a blank area, said relay having a pair of normally open and spaced circuit-controlling contacts one of which is movable towards the other, a device movable in timed relation to said carriage and normally decoupled from said movable contact, means for coupling said device to said movable contact when said relay means responds to the scanning of a blank area, and means for automatically returning said carriage to normal when said movable contact has been moved by said device into engagement with the other contact of said pair.

12. Facsimile apparatus according to claim 11, in which said device comprises a tape, and said relay has a needle-pointed member connected to said movable contact and adapted to pierce said tape for moving said movable contact into engagement with the other contact of said pair.

13. Facsimile apparatus according to claim 11, in which said automatic carriage return means comprises a detent pivotally attached to said carriage, a toothed rack, means holding said detent disengaged from said rack as long as said scanner is scanning subject matter to be transmitted, and means for engaging said detent with said rack when said scanner is scanning a blank area.

14. Facsimile apparatus according to claim 11, in which said automatic carriage return means comprises a detent attached to said carriage, a toothed rack, said coupling means maintaining said detent in engagement with said rack when said scanner has scanned a blank area of predetermined extent, a carriage return relay, and a pair of contacts for controlling the circuit of said carriage return relay, said detent when in engagement with said rack responding to a predetermined extent of further movement of said carriage to close said pair of contacts for operating said carriage return relay and thereby automatically returning the carriage to normal.

15. Facsimile apparatus comprising a facsimile scanner a rotatable scanning drum, a lead screw, means for rotating said drum and lead screw in fixed timed relation, a scanning carriage having a lead screw follower for engaging said lead screw to move said carriage lengthwise of said drum, a toothed rack, a detent member pivotally attached to said carriage, means coupled to said scanner to derive a control voltage, means for holding said detent disengaged from said rack, means coupled to said coupling means effective in response to the control voltage derived from said scanner upon scanning of a blank area for causing said detent holding means to release and to engage said detent with said rack, means for returning said carriage to normal, and means responsive to the engagement of said detent with said rack for a predetermined interval for causing said carriage return means to operate.

16. Facsimile apparatus according to claim 15, in which said lead screw follower is provided with electromagnetic means for disengaging it from said lead screw to allow return of said carriage.

17. Facsimile apparatus according to claim 15, in which the means for engaging and disengaging said detent from said rack comprises an electromagnet, circuit means coupled to said coupling means for de-energizing said electro-magnet under control of said control voltage when a blank area is being scanned, a pair of contacts controlled by said detent one of said contacts being movable with said detent only when said detent is engaged with said rack and responsive to further movement of said carriage for engaging the other contact of the pair and thereby effecting operation of said carriage return means.

18. Facsimile apparatus comprising a scanning drum having mounted thereon a sheet to be scanned and with the subject matter thereon arranged in spaced lines extending circumferentially around said drum, said sheet when so mounted having an overlap margin area extending along the drum length, a scanning head, means to move said head longitudinally of said drum while said drum is rotating to scan said lines of subject matter, means coupled to the output of said scanning head to derive a control voltage, means for returning said scanning head to a normal position, means responsive to said control voltage for controlling operation of said scanning head returning means after a blank area of predetermined extent is scanned, and means actuated by said drum having a pair of electrical contacts adapted to be cyclically opened, said contacts serially connected between said control voltage deriving means and said control voltage responsive means, said contacts adapted to lock out the effect of subject matter scanning during the scanning of the overlap margin area of said sheet.

WILLIAM P. ASTEN.

REFERENCES CITED

The following references are of record in the file of this patent:

UNITED STATES PATENTS

| Number | Name | Date |
|---|---|---|
| 2,255,868 | Wise et al. | Sept. 16, 1941 |
| 2,333,272 | Ridings | Nov. 2, 1943 |